(12) United States Patent
Alford et al.

(10) Patent No.: US 6,610,623 B1
(45) Date of Patent: Aug. 26, 2003

(54) MODIFIED SINTERED MATERIALS

(76) Inventors: Neil McNeill Alford, Flat 3, 33 Compayne Gardens, London NW6 3DD (GB); Stuart James Penn, 34 Maitland Road, Wickford, Essex SS12 9PU (GB)

( * ) Notice: Subject to any disclaimer, the term of this patent is extended or adjusted under 35 U.S.C. 154(b) by 0 days.

(21) Appl. No.: 09/597,396

(22) Filed: Jun. 19, 2000

Related U.S. Application Data

(63) Continuation-in-part of application No. 09/101,986, filed as application No. PCT/GB96/03150 on Dec. 22, 1995, now abandoned.

(30) Foreign Application Priority Data

Dec. 22, 1995 (GB) .............................................. 9526339

(51) Int. Cl.$^7$ .............................................. C04B 35/10
(52) U.S. Cl. ...................................... 501/153; 501/127
(58) Field of Search .................................. 501/153, 127

(56) References Cited

U.S. PATENT DOCUMENTS 4,762,655 A * 8/1988 Rhodes et al. ............... 501/127
4,952,537 A * 8/1990 Hayashi et al. ............. 501/127

FOREIGN PATENT DOCUMENTS

JP 08059338 A * 3/1996

* cited by examiner

*Primary Examiner*—C. Melissa Koslow
(74) *Attorney, Agent, or Firm*—Bartlett & Sherer; Ronald B. Sherer

(57) ABSTRACT

Low dielectric loss ceramic materials useful in dielectric resonators comprise alumina doped with a minor amount, preferably below 2% by weight of a metal or semi metal oxide, preferably an oxide of titanium, niobium, yttrium or zirconium. The compositions can be made by sintering the powders together below their melting point and materials with a with a Q value of greater than 35,000 at 9–10 GHz and at 25° C., can be obtained.

15 Claims, No Drawings

MODIFIED SINTERED MATERIALS

RELATED APPLICATIONS

This Application is a Continuation-In-Part of application Ser. No. 09/101,986 filed Jul. 13, 1998, now abandoned, which is a 371 of PCT/GB96/03150 based upon G.B. Application 95/26339.8 having a Priority Date of Dec. 22, 1995.

FIELD OF THE INVENTION

This invention relates to the production of low dielectric loss ceramic materials, particularly ceramic materials useful in dielectric resonators. In current microwave communication, technology dielectric resonators (DRs) are key elements for filters, low phase noise oscillators and frequency standards. DRs possess resonator quality factors (Q) comparable to cavity resonators, strong linearity at high power levels, weak temperature coefficients, high mechanical stability and small size.

BACKGROUND OF THE INVENTION

Ceramic dielectric materials are used to form thermally stable DRs as key components in a number of microwave subsystems which are used in a range of consumer and commercial market products. These products range from Satellite TV receiver modules (frequency converter for Low Noise Broadcast (LNB)), Cellular Telephones, PCN's. (Personal Communication Networks Systems) and VSAT (Very Small Aperture Satellite) systems for commercial application to emerging uses in transportation and automobile projects, such as sensors in traffic management schemes and vehicle anti-collision devices. Dielectric Resonators may be used to determine and stabilise the frequency of a microwave oscillator or as a resonant element in a microwave filter. New systems of satellite TV transmission, based on digital encoding and compression of the video signals, determine the need for improved DR components. The availability of advanced materials will also enable necessary advances in the performance of DRs used for other purposes as referred to above.

In this specification, the term 'ceramic' means any solid inorganic particulate material, the particles of which can be caused to sinter together by the application of heat. The term ceramic has been used also to describe single crystals of inorganic materials such as alumina, titania, etc.

Low dielectric loss materials are highly desirable in the area of communications over a wide frequency range. As an example, resonators using dielectric sintered ceramics may be used in base stations required for mobile communications. The materials used are often complex mixtures of elements.

One of the earliest resonator materials was Barium Titanate ($BaTiO_3$ or $BaTi_4O_9$ see, for example, T Negas et al American Ceramic Society Bulletin, vol. 72, pp 80–89 1993). The dielectric loss of a material is referred to as the tan delta and the inverse of this quantity is called the Q (Quality Factor). The Q factor of a resonator is determined by choosing a resonance and then dividing the resonant frequency by the band width 3 dB below the peak.

The losses in ceramic materials may be associated with molecules or defects which can be spatially oriented (Debye loss), due to the inertia of free charges, e.g. electrons in a metal or resonant absorption at certain frequencies. It is considered that extrinsic factors such as impurities and e.g. oxygen vacancy concentration as well as microstructure are of overriding importance. Single crystals or 'perfect' crystals have a lower loss than corresponding poly-crystalline materials. The difference between a 'perfect' single crystal and a polycrystalline ceramic are thought to be due to the huge differences in microstructure and perfection between the two and are clear indicators why it is considered impossible to achieve a dielectric loss approaching that of single crystal counterparts in sintered materials.

A single crystal is made from a melt. The melting temperatures of these crystals is extremely high. For example, the melting point of alumina is 2072C, of magnesia 2852C, of zirconia 2700C, of yttria 2410C and titania 1850C.

The particulate ceramic material can be shaped in a variety of ways, for example, by uniaxial powder pressing, by isostatic pressing, by slip-casting or by polymer processing and extrusion. The resultant shape is then sintered at high temperature and this is associated with a shrinkage and a decrease in the volume of the body. The sintering step can take place in air or in special atmospheres be they oxidising, reducing or inert.

Sintering a ceramic involves taking a fine powder of the material, pressing it into the desired shape and then heating it to temperatures less than their melting point (usually about 75% of the melting point). The powders sinter together in an effort to reduce surface energy and this is accomplished by the reduction in surface area until the porosity is reduced substantially or entirely. The sintering process involves less expensive capital equipment and is less energy intensive.

The major problem with dielectric ceramics is that their dielectric loss is much higher than single crystals. Single crystal materials can exhibit very low loss and this is usually attributed to the absence of grain boundaries and the greater perfection in their structure. The problem with single crystals is that they are time consuming to manufacture and they are extremely expensive. For example, a single crystal of alumina in cylindrical form is around 10,000 times more expensive than an identically shaped sintered alumina.

We have now discovered sintered ceramic materials with a low dielectric loss and a method for making them.

SUMMARY OF THE INVENTION

The object of the invention is to provide a doped alumina ceramic which has a high Q value. The object is achieved by forming the ceramic from a homogenous mixture of alumina containing less than 165 ppm impurities, less than 1% weight of a metal oxide of a metal of cation ionic radius of 0.55 to 1, in which the alumina has a particle size of 0.01 to 2 microns and a density of at least 98% theoretical.

The metal or semi-metal oxide, which forms the minor part of the materials of the invention, are preferably oxides of elements of Group III and IV of the periodic table such as Ti, Nb, Y and Zr. The minor part is preferably present in an amount of less than 2% by weight of the total weight of the composition and, more preferably, less than 1% by weight.

The materials of the present invention can be made by homogenously mixing the alumina powder and the dopant powder. In order to achieve homogenous mixing the particle size of the dopant should be the same or less than that of the alumina powder. Alternatively homogenous mixing can achieved by precipitating from solution. The mixed powders can be formed into the ceramic by mixing the powders of alumina and the minor component, for example, of particle size of 0.01 to 2 microns and pressing the mixture into a shape and then heating to a temperature below its melting point, typically 75% of the melting point. The powders sinter together until the porosity is substantially or entirely reduced. Preferably the temperature of sintering for powders such as alumina is less than 1600° C. and more preferably between 1500° C. and 1600° C. In place of the metal oxide used as the dopant a salt of the metal which forms the oxide on the conditions of forming the ceramic can be used e.g. the metal carbonate.

It is very surprising that the addition of dopant oxides with a low Q factor to alumina can increase the Q factor of the resulting material very considerably and can approach the value of single crystals. It was considered that any material with grain boundaries must inevitably show high dielectric loss.

The dielectric loss of polycrystalline sintered alumina has been measured by several workers and the results vary widely. For example, Ceramic Source, vol. 6 1990, American Ceramic Society (publ) reports the loss of alumina as Q=1000 at 10 GHz and 25° C.

The highest Q previously measured in alumina at room temperature (i.e. approximately 25° C.) is by Woode et al (R A Woode, E N Ivanov, M E Tobar and D G Blair 'Measurement of dielectric loss tangent of alumina at microwave frequencies and room temperature' Electronics Letters, vol. 30 no. 25, Dec. 8, 1994) who measured a Q of 23,256. This Article noted that purity alone was a poor indicator of the dielectric loss tangent. We have found that although an impure alumina will give a poor Q, a very pure alumina is not a guarantee of a high Q. Pure alumina can have compounds added to it in order to assist the sintering process. These additions should not adversely influence the Q. So, for example, magnesia may be added to a very pure alumina and this will assist the sintering but will not adversely affect the Q if added in small quantities. However, adverse effects are observed with impurities such as alkali salts (sodium and potassium) and metallic elemental impurities such as iron.

The invention also comprises a sintered ceramic material comprising an alumina and minor amount of a metal or semi-metal oxide which has a Q value greater than 25,000, more preferably greater than 30,000 and even more preferably greater than 45,000 at 9 to 10 GHz and at 25° C.

DETAILED DESCRIPTION OF THE INVENTION

The invention is described in the following Examples.

The aluminas used were commercially available aluminas and the analyses of the powders used in the examples are given in Table 1 with the impurities given in parts per million based on the total weight of the sample.

The aluminas used had a particle size of 0.01 to 2 microns.

TABLE 1

Chemical analyses of powders used (ppm)

| | "A" | "B" | "C" |
|---|---|---|---|
| $Na_2O$ | 800 | 300 | 20 |
| MgO | 400 | 1000 | 16 |
| $SiO_2$ | 400 | 400 | 85 |
| $Fe_2O_3$ | 300 | 100 | 29 |
| CaO | 200 | 40 | |
| $SO_3$ | | | |
| CuO | | | 13 |
| surface area $m^2g^1$ | 7 | 5 | 5–10 |
| Sample % Density | 97.8 | 98.2 | 98 |

EXAMPLES

Examples 1 to 3 are comparative examples.

Powders A-C inclusive were pressed in a 13.5 mm diameter stainless steel die press at a pressure of 100 MPa. The pressed samples were sintered in air at a temperature of 1550° C. for 300 mins. The sample density was then measured and the dielectric constant and dielectric loss experiments were carried out using a parallel plate resonator and employing a modified Haaki-Coleman technique described in B. W Haaki and P. D Coleman 'A dielectric resonator method of measuring inductive capacities in the millimeter range', IFEE Trans. Microwave Theory Tech. Vol. 8, p.402–410 (1960). Here the dielectric puck is placed not directly onto the lower copper plate but onto a low loss material with a much lower dielectric constant. We have used a quartz crystal 4 mm thick and 10 mm in diameter. The sample dimensions were approximately 10 mm diameter, 4 mm thick discs. The measurements were made using a Hewlett Packard HP8719C vector network analyser with 1 Hz resolution and the TE011 mode was examined. All dielectric measurements were carried out at room temperature in air at a relative humidity of approximately 30%. No special precautions were taken to prevent the adsorption of water to the sample surface. The loss measurements are presented in terms of the Q factor, i.e. tan delta$^{-1}$, the measuring frequency was 9–10 GHz at a temperature of 25° C. The density of the sintered products was in the range 98% to 99.5% theoretical i.e. they had a porosity of 2% to 0.5%.

Example 1

Sample A showed a Q of 3,500 while B had a Q factor less than 1000

| | A | B |
|---|---|---|
| Q | 3,500 | <1000 |

Example 2

The chemically purer powder C was made into dense discs. Sample C2, was subjected to a sintering temperature of 1600° C. for 300 mins.

| | C2 |
|---|---|
| Q | 12,000 |

Example 3

The same alumina powder as used in C, was sintered at 1500° C. for 300 minutes.

| | C |
|---|---|
| Q | 16,000 |

Examples 4 and 5 and 10 to 12 are examples of the invention and Examples 8 and 9 are comparative examples.

Examples 4 to 6

The dopant powder of particle size smaller than that of the alumina powder was homogenously mixed with the alumina powder and formed into a ceramic as above.

In the second series of experiments, Alumina C was doped with $TiO_2$. The addition of $TiO_2$ influences the sintering temperature at which the material achieves high density and for this reason the aluminas doped with $TiO_2$ were sintered at 1500° C. To check the effect of a reduction in the sintering temperature on the pure alumina, alumina C was also sintered at 1500° C. $TiO_2$ sintered in air to full density displays a very poor Q which was measured at 1,500. This is due to the fact $TiO_2$ is easily reduced. Small deviations from stoichiometric $TiO_2$ causes a random distribution of point defects. As the defect concentration increases, their interaction increases and ordering can occur. The dielectric loss has suffered in comparison with the single crystal Q value which was measured at 7,000.

Example 4

A pure alumina (alumina C) was doped by 0.5% weight of Titanium dioxide powder. (Sample name CT0.5). The mixture was sintered at 1500° C. as in Example 3 and the Q measured as in Example 1, and was found to be 47,000.

| CT0.5 | |
|---|---|
| Q | 47,000 |

Example 5

A pure alumina (alumina C) was doped with 1% by weight of $TiO_2$ (sample name CT1.0) and sintered at 1500° C., i.e. at the same temperature as that used for samples C in Example 3. The Q was found to be 35,000.

| CT1.0 | |
|---|---|
| Q | 35,000 |

Example 6

A pure alumina (alumina C) was doped with 5% by weight of $TiO_2$ (sample name CT5.0) and sintered at 1500° C., i.e. at the same temperature as that used for samples C in Example 3. The Q was found to be 12,650.

| CT5.0 | |
|---|---|
| Q | 12,650 |

Example 7

A pure alumina (alumina C) was doped with 10% by weight of $TiO_2$ (sample name CT10.0) and sintered at 1500° C., i.e. at the same temperature as that used for samples C in Example 3. The Q was found to be 7,300.

| CT10.0 | |
|---|---|
| Q | 7,300 |

Example 8

A pure TiO2 was sintered to full density in air at 1400° C. The purpose of this example is to demonstrate that the Q of $TiO_2$ is much lower than the Q of $Al_2O_3$ and hence demonstrate that it might be expected that any addition of $TiO_2$ to $Al_2O_3$ would have the effect of decreasing the Q rather than enhancing the Q. Using a mixtures rule, common in the description of dielectrics, it might be expected that at 0.5% $TiO_2$ in $Al_2O_3$ the Q should be 33,500 when in fact the measured Q is 47,500.

| TiO2 | |
|---|---|
| Q | 1,500 |

Example 9

By was of comparison, three single crystals (SC1–3) of sapphire ($Al_2O_3$) were tested under identical conditions. As expected, the Q of the single crystals was higher than the Q of the sintered aluminas but, surprisingly, the Q factors for the sintered aluminas were only a factor of approximately two lower.

TABLE 2

| | SC1 | SC2 | SC3 |
|---|---|---|---|
| Q | 100,000 | 100,000 | 100,000 |

Examples 10, 11 and 12

Dopants other than $TiO_2$ close to Ti in the periodic table, i.e. Nb, Zr and Y, were also added to alumina C. The dopants were added at the 0.25, 0.5, 1 and 5 wt % level a total of 12 different compositions. All samples were sintered at 1500° C. for 300 mins in air. In none of the measurements did the Q factor exceed the highest value for the $TiO_2$ addition. However, there are indications of increases in the Q which is surprising as all three dopants have a higher dielectric loss in comparison with $Al_2O_3$.

Examples

| Dopant | Example 10 $Nb_2O_5$ | Example 11 $Y_2O_3$ | Example 12 $ZrO_2$ |
|---|---|---|---|
| Q (0.25% dopant) | | | 26,000 |
| Q (0.5% dopant) | 30,000 | 25,400 | 28,400 |
| Q (1.0% dopant) | | 36,000 | |
| Q (5.0% dopant) | 30,000 | 30,000 | 17,000 |

Example 13

The effect of cation ionic radius was determined by forming a series of ceramics with a range of metal oxides.

In some case the carbonates were used for convenience, these form the oxides under the conditions of forming the ceramics. The ceramics were made as above and their Q values measured and the results shown, in Table 2

The mol wt % is shown to show the comparative effectiveness of the dopants, the weight per cent in all cases was less than 2 wt %.

TABLE 2

| Dopant | Cation ionic Radius (A°) | Q |
|---|---|---|
| $K_2CO_3$ | 1.38 | 1060 |
| $Na_2CO_3$ | 1.02 | too low to measure |
| $BaCO_3$ | 1.35 | 12032 |
| $SrCO_3$ | 1.18 | 15790 |
| $CaCO_3$ | 1 | 24045 |
| ZnO | 0.74 | 36475 |
| CuO | 0.73 | 41290 |
| MgO | 0.72 | 37845 |
| $MnCO_3$ | 0.67 | 37891 |
| $La_2O_3$ | 1.032 | 5972 |
| $Nd_2O_3$ | 0.983 | 40384 |
| $Sm_2O_3$ | 0.958 | 38901 |
| $Y_2O_3$ | 0.9 | 43726 |
| $Fe_2O_3$ | 0.55 | 1311 |
| $ZrO_2$ | 0.72 | 32607 |
| $TiO_2$ | 0.605 | 41614 |
| $Nb_2O_5$ | 0.64 | 41210 |

What is claimed is:

1. A doped alumina ceramic composition having a Q value greater than 25,000 at 9–10 GHz at a temperature of 25° C. which comprises a major part of alumina containing less than 165 ppm impurities, and a dopant of less than 5% by weight of a metal oxide having a cation ionic radius of about 0.55 to 1, and an alumina particle size of about 0.01 to 2 microns, and a density of at least 98% theoretical, and wherein said dopant is an oxide of titanium, niobiums, yttrium or zirconium.

2. The composition of claim 1 wherein said dopant comprises less than 2% by weight of said metal oxide.

3. The composition of claim 2 wherein said dopant comprises less than 1% by weight of said metal oxide.

4. A doped alumina ceramic composition having a Q value greater than 32,000 at 9–10 GHz at a temperature of 25° C. which comprises a major part of alumina containing less than 165 ppm impurities, and a dopant of less than 5% by weight of a metal oxide having a cation ionic radius of about 0.6 to 1, and an alumina particle size of about 0.01 to 2 microns, and a density of at least 98% theoretical, and wherein said dopant is an oxide of the group comprising ZnO, CuO, MgO, $Nd_2O_3$, $Sm_2O_3$, $Y_2O_3$, $ZrO_2$, $TiO_2$ and $Nb_2O_5$.

5. The doped alumina ceramic composition of claim 4 having a Q value greater than 40,000.

6. A method of producing a dielectric of sintered alumina of extremely low dielectric loss comprising the steps of providing a substantially pure alumina powder having a total impurity level of less than 165 ppm and a particle size in the order of 0.01 to 2 microns, homogeneously mixing said powder with less than 5% by weight of a dopant selected from metal oxides, with a dopant consisting of oxides of titanium, niobium, yttrium, and zirconium, sintering the mixture of alumina and dopant at a temperature of 1500° C. to 1600° C. until the density is 98% or greater and the Q value in greater than 24,000 at 9–10 GHz at 25° C.

7. A sintered alumina produced by the process of claim 6.

8. A doped alumina ceramic composition having a Q value greater than 25,000 at 9–10 GHz at a temperature of 25° C. which is formed from a mixture comprising a major part of alumina containing less than 200 ppm impurities, and a dopant of less than 5% by weight of a metal oxide having a cation ionic radius of about 0.55 to 1, and an alumina particle size of about 0.01 to 2 microns, and a density after sintering in the order of at least 98% of theoretical, and wherein said dopant is a metal oxide and said mixture is sintered in a non-reducing atmosphere.

9. The composition of claim 8 wherein said dopant comprises less than 1% by weight of said metal oxide.

10. A doped alumina ceramic composition having a Q value greater than 30,000 at 9–10 GHz at a temperature of 25° C. which is formed from a mixture comprising a major part of alumina containing less than 200 ppm impurities, and a dopant of less than 2% by weight of a metal oxide having a cation ionic radius of about 0.6 to 1, and an alumina particle size of about 0.01 to 2 microns, and has a density after sintering of at least 98% of theoretical, and wherein said dopant is an oxide of the group comprising ZnO, CuO, MgO, $Nd_2O_3$, $Sm_2O_3$, $Y_2O_3$, $ZrO_2$, $TiO_2$ and $Nb_2O_5$.

11. The doped alumina ceramic composition of claim 10 having a Q value greater than 40,000.

12. The doped alumina ceramic composition of claim 10 wherein said dopant is present in the range of 0.5% to 1.0% by weight.

13. A method of producing a dielectric of sintered alumina of extremely low dielectric loss having a Q value greater than 25,000 comprising the steps of providing a substantially pure alumina powder having a total impurity level of less than 300 ppm and a particle size in the order of 0.01 to 2 microns, homogeneously mixing said powder with less than 5% by weight of a dopant comprising metal oxides, sintering the mixture of alumina and dopant in a non-reducing atmosphere until the density is at least 98% and the Q value is greater than 25,000 at 9–10 GHz at 25° C.

14. The method of claim 13 wherein said non-reducing atmosphere is air.

15. A sintered alumina produced by the process of claim 13.

* * * * *